United States Patent
Steele et al.

(10) Patent No.: US 8,899,201 B2
(45) Date of Patent: Dec. 2, 2014

(54) ONE WAY CLUTCH WITH VIBRATION DAMPER FOR AN ENGINE STARTING SYSTEM

(75) Inventors: Sean Steele, Mississauga (CA); Adrian Cioc, Ajax (CA)

(73) Assignee: Magna Powertrain of America, Inc., Troy, MI (US)

( * ) Notice: Subject to any disclaimer, the term of this patent is extended or adjusted under 35 U.S.C. 154(b) by 400 days.

(21) Appl. No.: 13/510,755

(22) PCT Filed: Nov. 19, 2010

(86) PCT No.: PCT/CA2010/001851
§ 371 (c)(1),
(2), (4) Date: May 18, 2012

(87) PCT Pub. No.: WO2011/060551
PCT Pub. Date: May 26, 2011

(65) Prior Publication Data
US 2012/0234281 A1   Sep. 20, 2012

Related U.S. Application Data

(60) Provisional application No. 61/262,729, filed on Nov. 19, 2009.

(51) Int. Cl.
| | |
|---|---|
| *F02N 15/08* | (2006.01) |
| *F02N 11/00* | (2006.01) |
| *F16D 3/12* | (2006.01) |
| *F02N 15/02* | (2006.01) |
| *F16D 41/067* | (2006.01) |
| *F02N 11/08* | (2006.01) |

(52) U.S. Cl.
CPC .......... *F02N 15/022* (2013.01); *F16D 2300/06* (2013.01); *F02N 2250/08* (2013.01); *F02N 11/08* (2013.01); *F16D 41/067* (2013.01)

USPC .................................... 123/179.25; 192/55.3

(58) Field of Classification Search
CPC ....... F02N 15/08; F02N 15/02; F02N 15/022; F02N 11/00; F16D 41/067; F16D 2300/08; F16D 3/12; F16D 3/64; B60K 26/04
USPC ........... 123/179.25; 903/902, 904; 180/65.22; 192/55.3
See application file for complete search history.

(56) References Cited

U.S. PATENT DOCUMENTS

| | | | | |
|---|---|---|---|---|
| 6,119,548 | A | * | 9/2000 | Murphy ........................ 74/570.2 |
| 6,712,188 | B2 | * | 3/2004 | Ando ........................ 192/45.011 |

(Continued)

FOREIGN PATENT DOCUMENTS

| | | |
|---|---|---|
| EP | 1910668 A1 | 4/2008 |
| EP | 2169214 A1 | 3/2010 |

(Continued)

*Primary Examiner* — Hieu T Vo
*Assistant Examiner* — Arnold Castro
(74) *Attorney, Agent, or Firm* — Dickinson Wright PLLC

(57) ABSTRACT

A starting system for a hybrid vehicle includes an internal combustion engine having a crankshaft rotatably supported within an engine block. The starting system includes a pinion gear driven by a starter motor, a drive plate having a set of teeth in constant meshed engagement with the pinion gear, and a one-way clutch. The one-way clutch is adapted to selectively drivingly interconnect the drive plate and the crankshaft. The clutch includes an inner race adapted to be fixed for rotation with the crankshaft, an outer race coupled for rotation with the drive plate, and a plurality of roller elements positioned radially therebetween. A fastener couples the drive plate to the outer race and compresses an elastomeric damper between the drive plate and the outer race.

15 Claims, 21 Drawing Sheets

(56) References Cited

U.S. PATENT DOCUMENTS

| | | | |
|---|---|---|---|
| 8,240,286 B2 * | 8/2012 | Li et al. | 123/179.25 |
| 8,287,390 B2 * | 10/2012 | Reinhart | 464/68.1 |
| 8,356,584 B2 * | 1/2013 | Almhagen et al. | 123/179.25 |
| 2008/0163843 A1 | 7/2008 | Sakai et al. | |
| 2010/0071652 A1 * | 3/2010 | Almhagen et al. | 123/185.14 |
| 2013/0256084 A1 * | 10/2013 | Steinberger | 192/70.27 |

FOREIGN PATENT DOCUMENTS

| | | |
|---|---|---|
| WO | WO-2007012946 A1 | 2/2007 |
| WO | WO-2010/028511 A1 | 3/2010 |
| WO | WO-2010028510 A1 | 3/2010 |

* cited by examiner

ONE WAY CLUTCH WITH VIBRATION DAMPER FOR AN ENGINE STARTING SYSTEM

CROSS-REFERENCE TO RELATED APPLICATIONS

This application claims the benefit of U.S. Provisional Application No. 61/262,729, filed on Nov. 19, 2009. The entire disclosure of the above application is incorporated herein by reference.

FIELD

The present disclosure generally relates to a torque transfer mechanism including an overrunning roller clutch for selectively transferring torque between two rotatable components. More particularly, a starting system for an internal combustion engine including an overrunning roller clutch is disclosed.

BACKGROUND

The statements in this section merely provide background information related to the present disclosure and may not constitute prior art.

Hybrid vehicles having an internal combustion engine as a first source of motive power and an electric motor as a second source of motive power have become increasingly popular based on fuel costs and environmental concerns. In at least one hybrid vehicle, the internal combustion engine is frequently started and stopped to most efficiently operate the vehicle. To minimize and/or eliminate noise, vibration and harshness associated with typical internal combustion engine starting systems, a starter motor gear may be positioned in constant meshed engagement with a rotating member of the internal combustion engine. A clutch is positioned along this power path to allow temporary driving interconnection between the starter motor and the internal combustion engine. While various clutch designs may be incorporated, cost, size, weight, lubrication requirements and torque carrying capacity concerns exist.

At least one known clutch associated with an automotive vehicle is positioned immediately adjacent to or partially within the engine block of the internal combustion engine. This positioning is required because lubricant within the engine block is provided to the clutch as well. While such an arrangement may prove to be beneficial, the positioning of the clutch in this system is limited and is not necessarily desirable. Furthermore, additional special machining may be required to the engine block or other internal combustion engine components in order to provide appropriate passageways for the lubricant to reach and return from the clutch.

Other known clutch characteristics such as the generation of heat and a loss of efficiency when operating in an overrunning mode may not lend themselves for use in a vehicle attempting to maximize energy efficiency. Accordingly, it may be desirable to provide an improved internal combustion engine starting system having a torque transfer mechanism including an improved one-way clutch.

SUMMARY

This section provides a general summary of the disclosure, and is not a comprehensive disclosure of its full scope or all of its features.

A starting system for a hybrid vehicle includes an internal combustion engine having a crankshaft rotatably supported within an engine block. The starting system includes a pinion gear driven by a starter motor, a drive plate having a set of teeth in constant meshed engagement with the pinion gear, and a one-way clutch. The one-way clutch is adapted to selectively drivingly interconnect the drive plate and the crankshaft. The clutch includes an inner race adapted to be fixed for rotation with the crankshaft, an outer race coupled for rotation with the drive plate, and a plurality of roller elements positioned radially therebetween. A fastener couples the drive plate to the outer race and compresses an elastomeric damper between the drive plate and the outer race.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
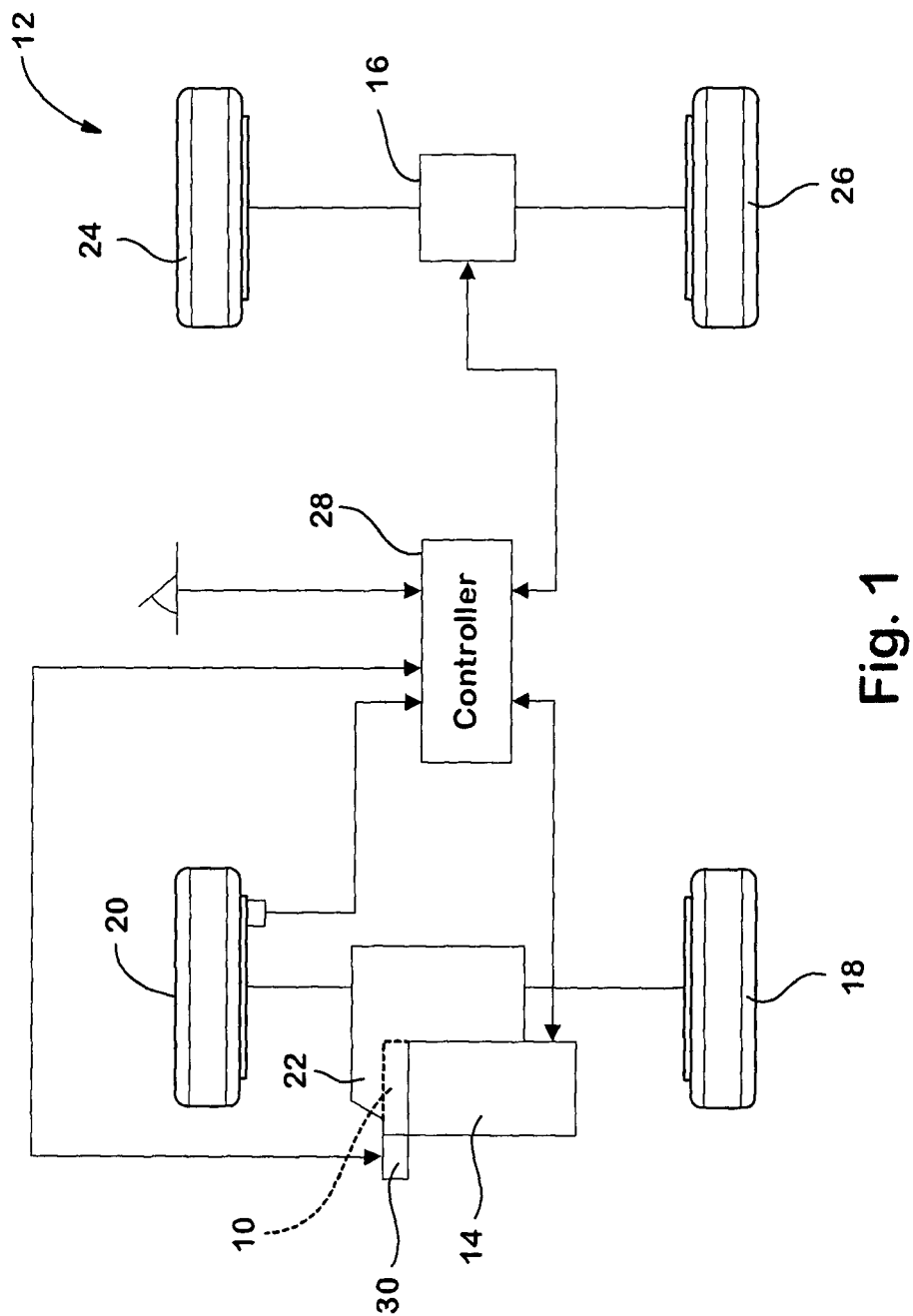
FIG. 1 is a schematic of an exemplary hybrid vehicle equipped with a sealed high capacity overrunning roller clutch.
Figure 2:
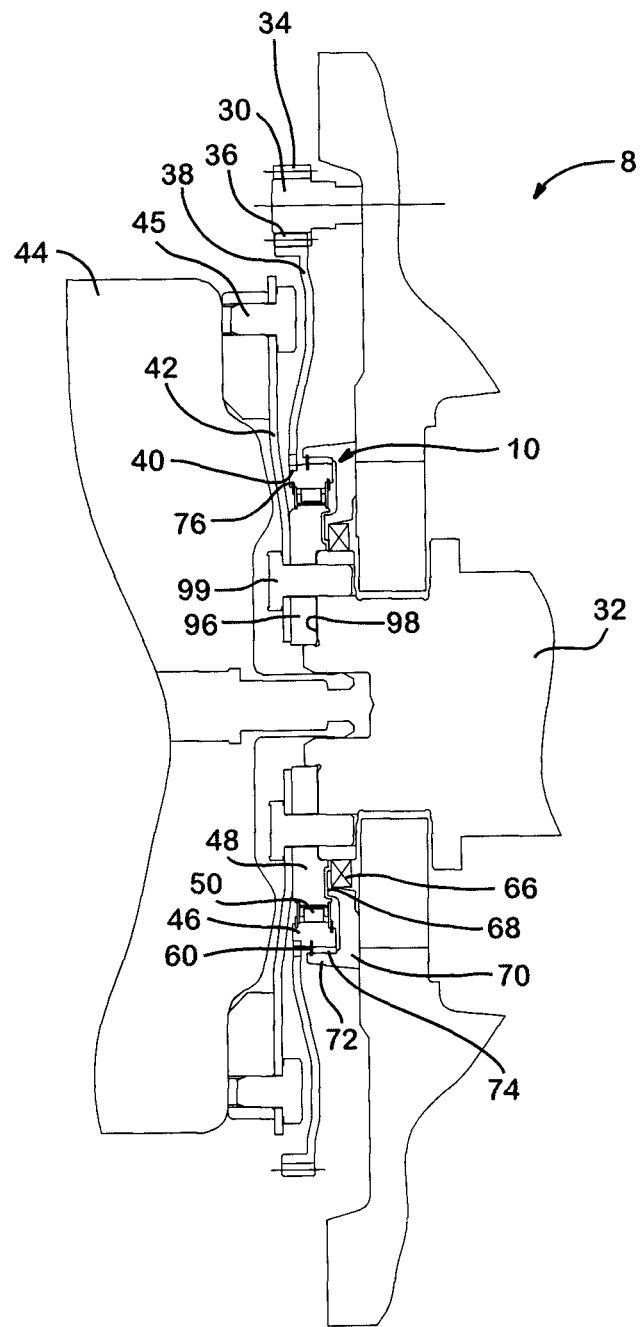
FIG. 2 is a fragmentary cross-sectional view depicting an internal combustion engine starting system including a sealed high capacity overrunning roller clutch.
Figure 3:
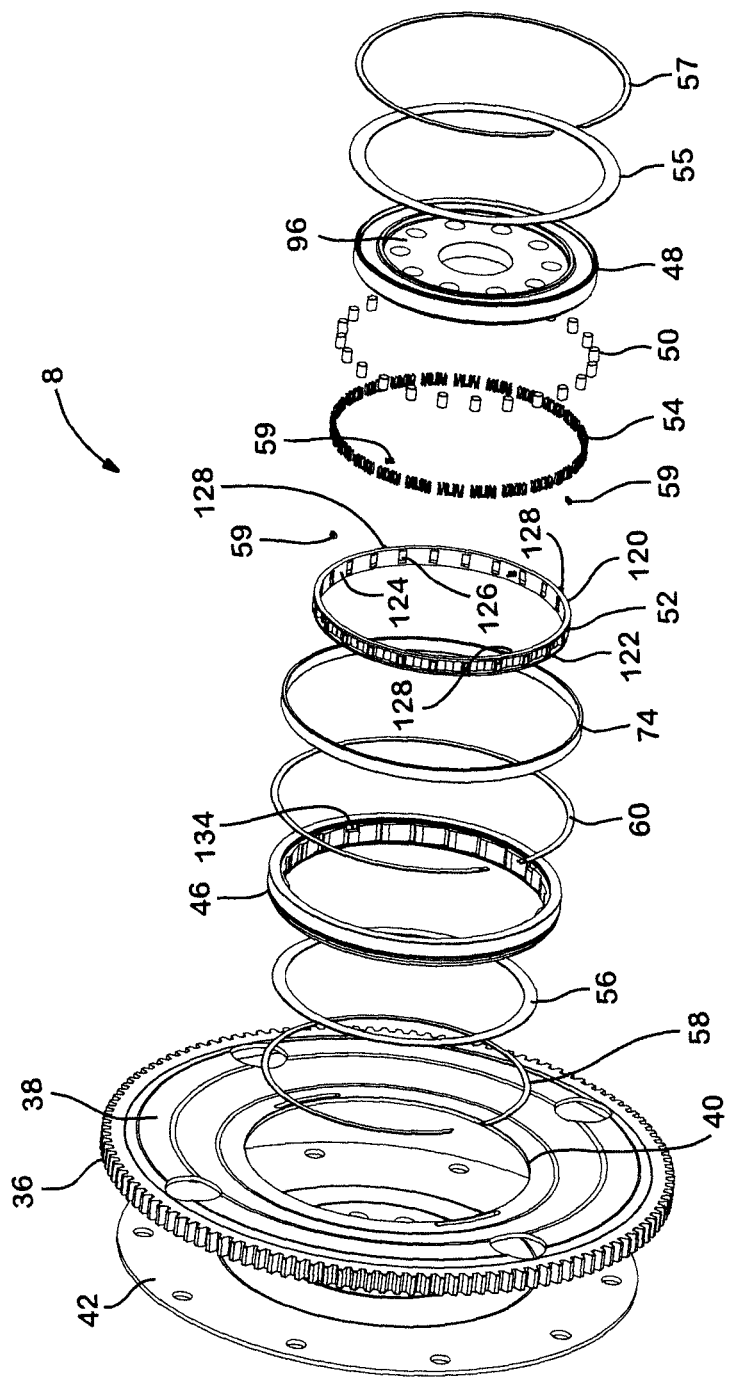
FIG. 3 is an exploded perspective view of a roller clutch and drive plate assembly.

The following description is merely exemplary in nature and is not intended to limit the present disclosure, application, or uses. It should be understood that throughout the drawings, corresponding reference numerals indicate like or corresponding parts and features.

FIGS. 1-7 depict a torque transfer system 8 including a sealed for life one-way overrunning clutch 10 arranged to selectively transfer torque between rotatable components within an exemplary vehicle 12. Vehicle 12 may be configured as a hybrid vehicle having an internal combustion engine 14 as a first source of motive power. A second source of motive power is provided by an electric motor 16. The schematic of FIG. 1 depicts a pair of driven wheels 18, 20 in receipt of torque provided by internal combustion engine 14 and transferred through a transmission 22. Electric motor 16 is shown in driving communication with another pair of driven wheels 24, 26. One skilled in the art will appreciate that the number of wheels driven by internal combustion engine 14 or electric motor 16 is merely exemplary and that any number of other power transmission arrangements may be implemented including a series hybrid drive, a parallel hybrid drive, or a series/parallel hybrid drive. Alternatively, the vehicle equipped with overrunning clutch 10 need not be a hybrid vehicle but may be solely equipped with an internal combustion engine power source.

During operation of vehicle 12, it is contemplated that internal combustion engine 14 will frequently be stopped and re-started in an attempt to improve fuel efficiency. For example, internal combustion engine 14 may be stopped once a controller 28 determines that the vehicle speed has been below a predetermined threshold for a predetermined amount of time such as when the vehicle is idling at a stop light. Depending on a number of inputs to controller 28, such as a throttle position, vehicle 12 may be propelled solely through power provided by electric motor 16, power provided by both internal combustion engine 14 and electric motor 16 or power provided solely by internal combustion engine 14. Regardless of the control scheme utilized, engine 14 may require frequent restarting.

Torque transfer mechanism 8 includes a starter motor 30 selectively operable to transfer torque to a crankshaft 32 of engine 14 when controller 28 signals for a starting or re-starting of internal combustion engine 14. Starter motor 30 includes a pinion gear 34 in constant meshed engagement with a ring gear 36 fixed to a drive plate 38. Ring gear 36 may be formed as one-piece with drive plate 38 or may be a separate component fixed for rotation thereto. Drive plate 38 includes a central aperture 40 in receipt of a portion of clutch 10. Clutch 10 selectively transfers torque between drive plate 38 and crankshaft 32. A flex plate 42 is fixed for rotation with a torque converter 44 by a plurality of fasteners 45. Torque converter 44 is supported for rotation within transmission 22. Flex plate 42 is also fixed for rotation with crankshaft 32 as described below.

Clutch 10 includes an outer race 46 fixed for rotation with drive plate 38, an inner race 48 fixed for rotation with crankshaft 32, a plurality of rollers 50, a cage 52, a plurality of roller springs 54, inner and outer plates 55, 56, inner and outer snap rings 57, 58, a plurality of accordion springs 59 and an ID-OD clip 60. Crankshaft 32 is supported for rotation within an engine block 62 by a plurality of bearings (not shown). A block seal 66 is seated within a bore 68 formed within a seal cover 70 fixed to engine block 62. Seal cover 70 includes a peripheral lip 72 in receipt of a bushing 74. Outer race 46 is supported for rotation by bushing 74. ID-OD clip 60 restricts axial movement of outer race 46 relative to seal cover 70.

A pilot portion 76 of outer race 46 is positioned within aperture 40 of drive plate 38. Pilot portion 76 may be coupled to drive plate 38 in a press-fit arrangement where an inner surface 78 of drive plate 38 is positioned in abutment with a stepped seat 80 of outer race 46. More particularly, drive plate 38 may be press-fit and microsplined to outer race 46. Alternatively, drive plate 38 and outer race 46 may be welded. An inner diameter of outer race 46 includes an inner ring groove 82, an outer ring groove 84 and a plurality of cam surfaces 86. Each of grooves 82, 84 has a substantially cylindrical shape. Cam surfaces 86 are circumferentially spaced apart from another with each cam surface 86 having a shallow end 92 and a deep end 94 further radially recessed into outer race 46.

Inner race 48 includes a substantially circular cylindrical mounting flange 96 in engagement with an end face 98 of crankshaft 32. As previously mentioned, inner race 48 is fixed for rotation with crankshaft 32. In the arrangement depicted in FIG. 2, inner race 48 is fixed to crankshaft 32 with threaded fasteners 99. Fasteners 99 fix inner race 48 and flex plate 42 for rotation with crankshaft 32. Inner race 48 includes an inner stepped recess 100 and an outer stepped recess 102 positioned on either side of a substantially smooth roller contact surface 104. Each of features 100, 102, 104 include substantially cylindrically-shaped surfaces.

A roller and cage subassembly 110 includes rollers 50, cage 52 and plurality of roller springs 54. Roller and cage subassembly 110 may be subsequently inserted between outer race 46 and inner race 48.

Cage 52 may be a molded plastic component or constructed from metal and may be referred to as skeleton 52. Cage 52 includes a first ring 120 and a second ring 122 spaced apart from one another and interconnected by a series of webs 124 axially extending between first ring 120 and second ring 122. Webs 124 are circumferentially spaced apart from one another a predetermined distance corresponding to a desired position of rollers 50. Webs 124 define a plurality of windows 126 within cage 52 to receive rollers 50 as well as roller springs 54 as will be described. Cage 52 also includes four radially outwardly extending arms 128 having an accordion spring 59 coupled thereto.

To assemble roller and cage subassembly 110, rollers 50 are snapped into place within opposing sets of roller springs 54. Each roller spring 54 includes a guide 130 including bifurcated legs 132 to position one side of each roller 50 at a desired location. At an end opposite of guide 130, roller spring 54 is coupled to cage 52. It should be appreciated that two roller springs 54 cooperate with each other to position a single roller 50.

Figure 4:
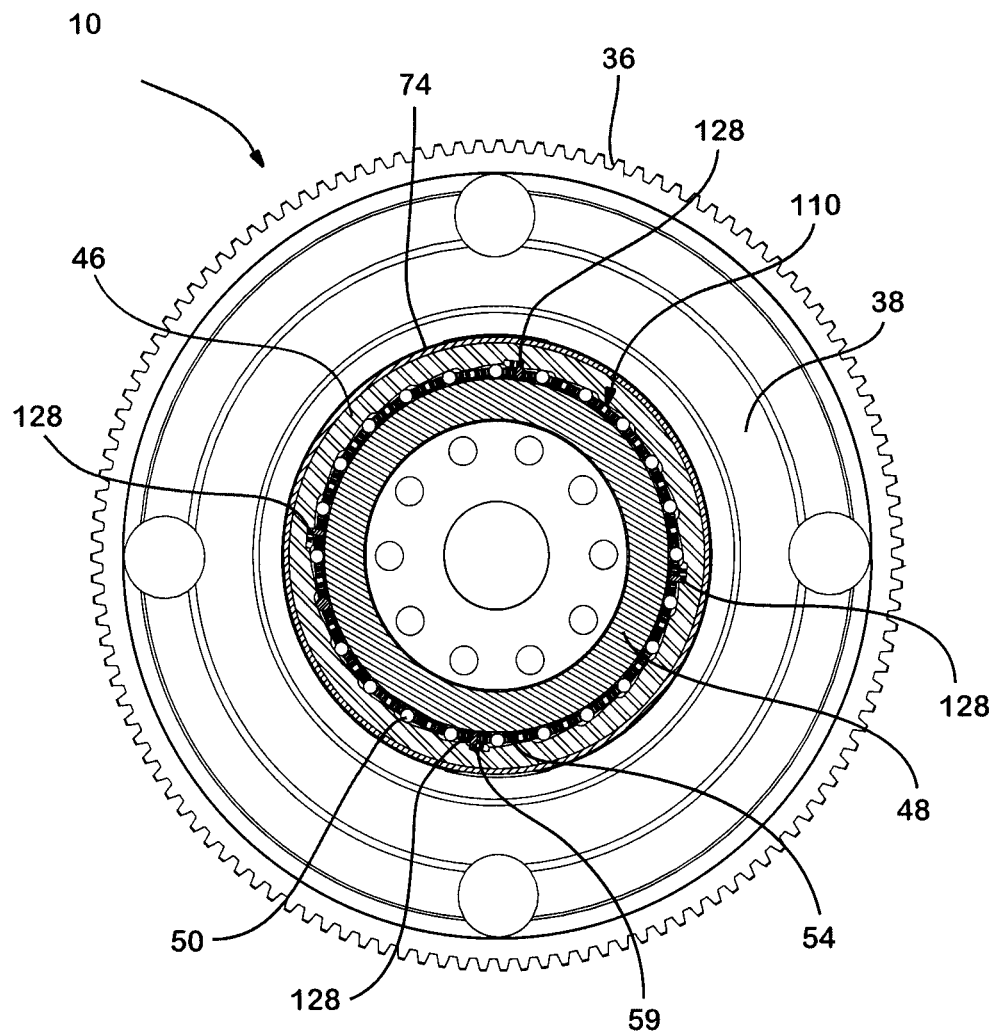
FIG. 4 is a plan view of a roller clutch and drive plate assembly.
Figure 5:
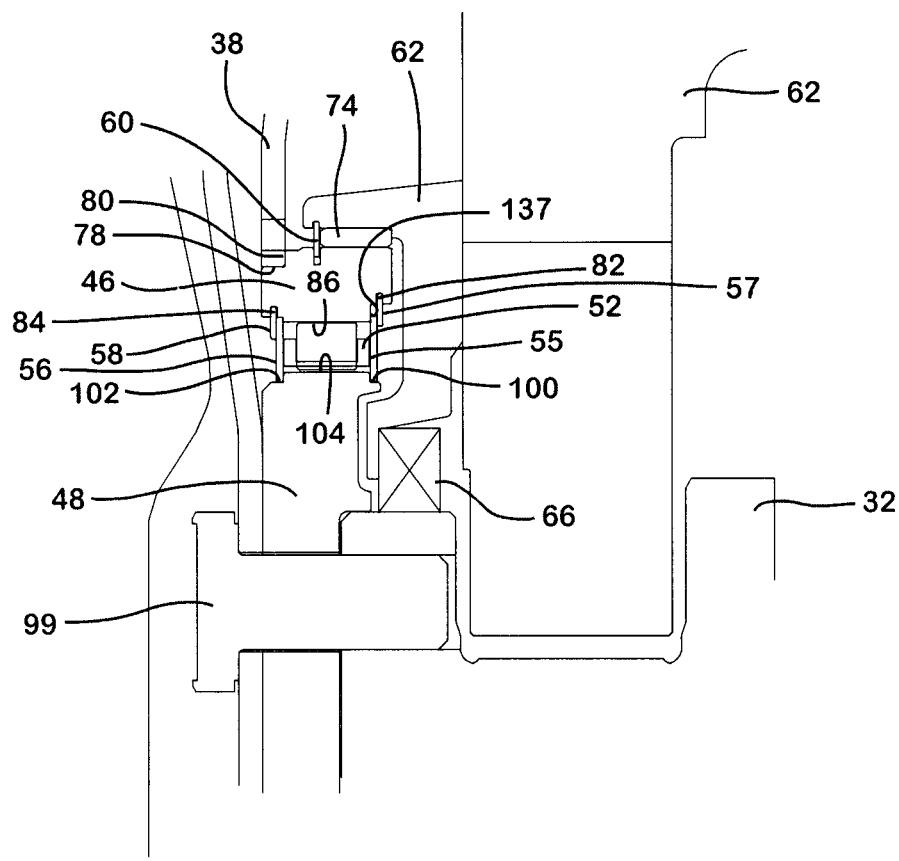
FIG. 5 is a fragmentary sectional view of a portion of the starting system.
Figure 6:
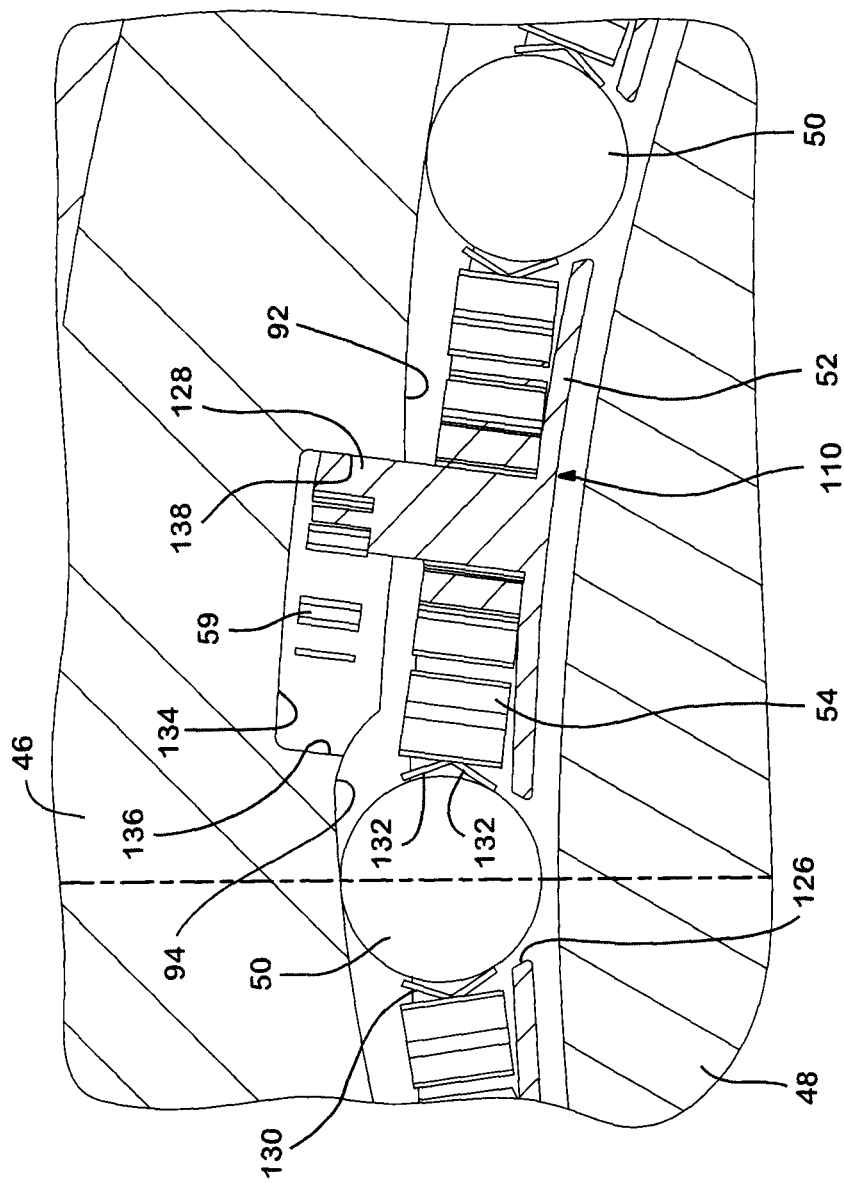
FIG. 6 is a fragmentary sectional view of the roller clutch assembly in a free-wheeling mode of operation.
Figure 7:
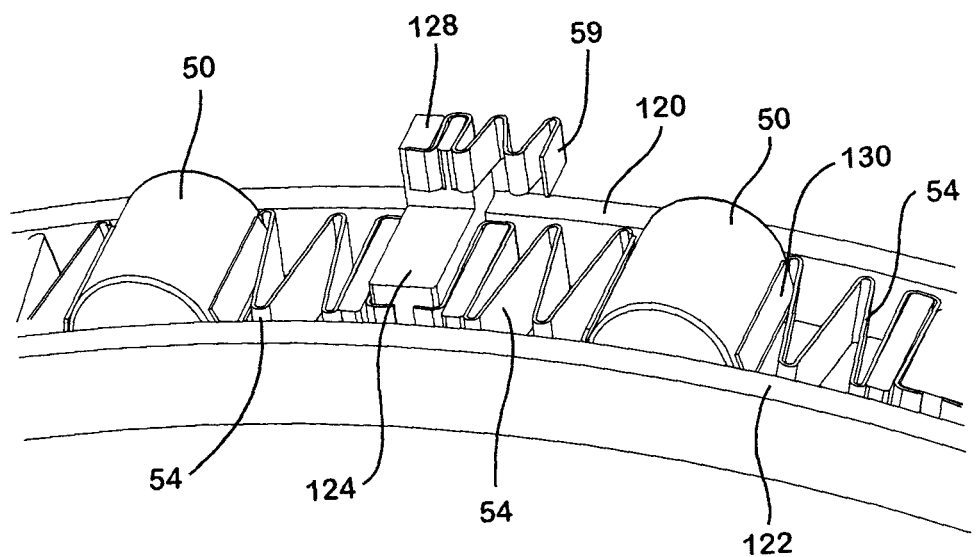
FIG. 7 is a fragmentary perspective view of another portion of the roller clutch.

Roller and cage subassembly 110 may now be positioned between inner race 48 and outer race 46. As shown in FIGS. 4 and 6, outer race 46 includes four circumferentially spaced apart recesses 134. The terminal ends of arms 128 and accordion springs 59 are positioned within recesses 134. More particularly, one end of accordion spring 59 engages a first sidewall 136 of recess 134. Arm 128 is biased toward a second opposing sidewall 138. When inner race 48 and outer race 46 are at rest, accordion springs 59 rotate cage 52 to engage arms 128 with second sidewalls 138. At this cage position, clutch 10 is in an open or free-wheeling mode where rollers 50 are spaced apart from inner race 48 and are located within deep ends 94. This is also the position of cage 52 when inner race 48 rotates relative to outer race 46 in a first direction such as when internal combustion engine 14 is operating and starter motor 30 is not operating.

Once roller and cage subassembly 110 is positioned between outer race 46 and inner race 48, one axial end of clutch 10 may be enclosed by positioning inner seal plate 55 in engagement with a seat 137 positioned adjacent to inner ring groove 82. The thickness of inner seal plate 55, inner ring groove 82, and the position of seat 137 cooperate with one another such that inner seal plate 55 is fixed for rotation with outer race 46. An inner circumferential edge of inner seal plate 55 is positioned proximate to but clear of inner race 48. A lubricant, such as grease, may be placed in contact with rollers 50, cage 52, roller springs 54 and inner seal plate 55. The lubricated roller and cage subassembly 110 may be enclosed by installing outer seal plate 56 and outer snap ring 58. Outer seal plate 56 is fixed for rotation with outer race 46 in a similar manner to that described in relation to inner seal plate 55. Outer seal plate 56 is positioned in close proximity to but spaced apart from inner race 48 such that frictional losses are minimized and/or eliminated during operation of clutch 10. It is envisioned that clutch 10 need not be lubricated after initial assembly. Accordingly, clutch 10 is a sealed-for-life component. As previously mentioned, ID-OD clip 60 restricts clutch 10 from axial movement relative to internal combustion engine 14. Furthermore, it should be appreciated that seal plates 55, 56 may alternatively be fixed for rotation with inner race 48 and clear of outer race 46.

Figure 8:
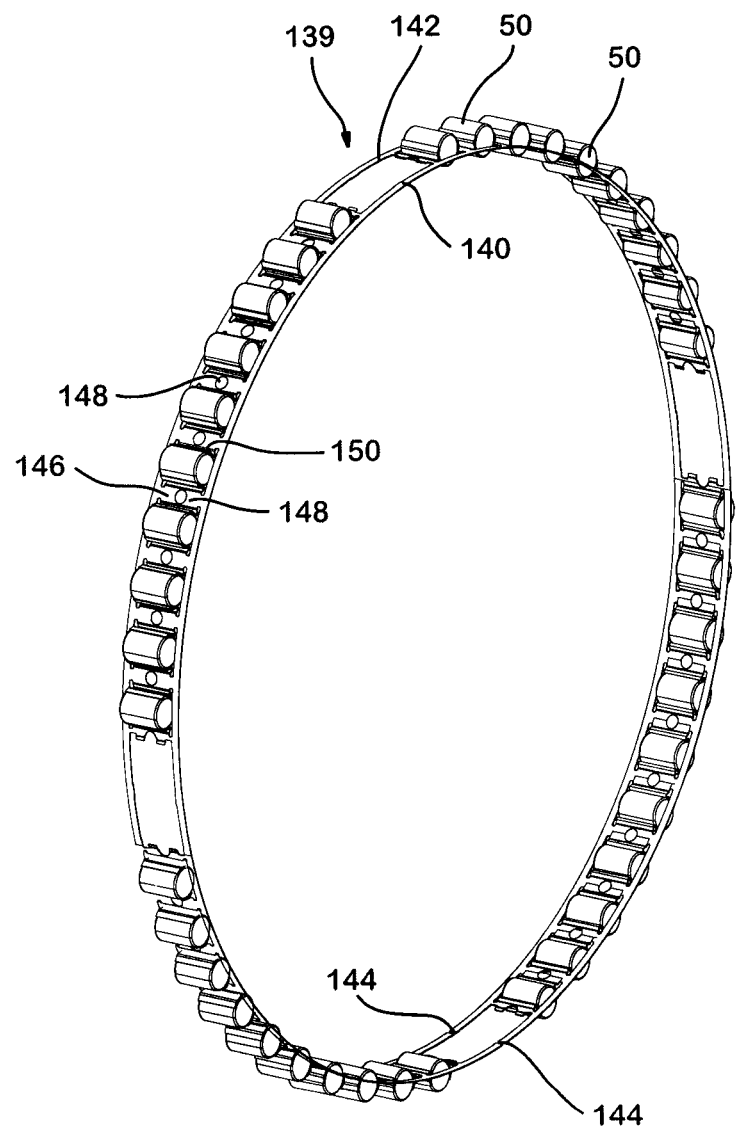
FIG. 8 is a perspective view of a portion of an alternate roller clutch.
Figure 9:
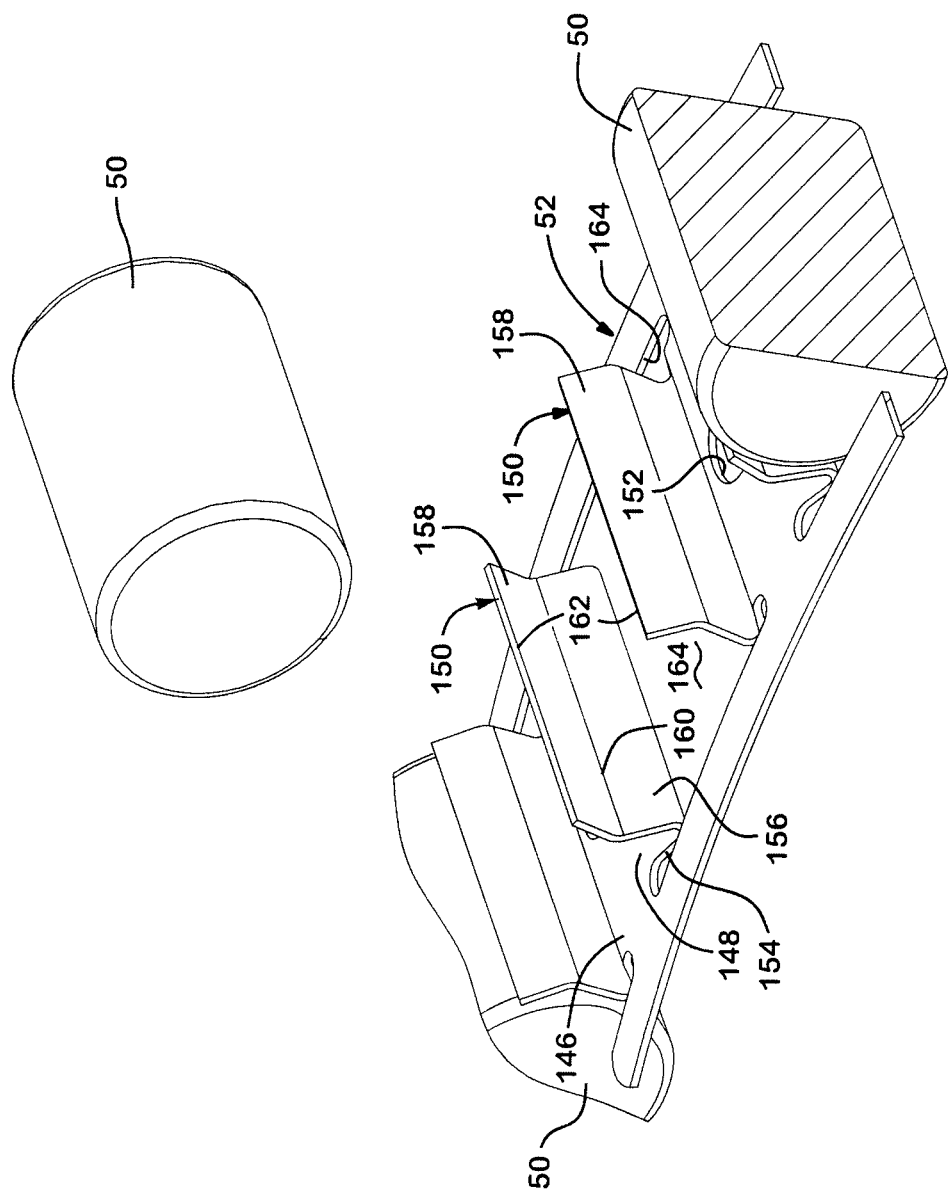
FIG. 9 is a fragmentary exploded perspective view of a portion of the alternate clutch of FIG. 8.

In another arrangement depicted in FIGS. 8 and 9, roller springs 54 may be replaced with a one-piece multi-spring 139 including a first rim 140 and a second rim 142 axially spaced apart from one another. Each of first rim 140 and second rim 142 are shaped as split rings having gaps 144 formed therein, respectively. A plurality of axially extending supports 146 interconnect first rim 140 and second rim 142. Supports 146 are circumferentially spaced apart from one another and each include a base portion 148 and a pair of upturned, radially outwardly extending, guides 150. Preferably, first rim 140, second rim 142 and supports 146 are integrally formed with one another from one piece of spring steel. Each base portion 148 includes an aperture 152 extending therethrough. Apertures 152 cooperate with radially inwardly extending pegs (not shown) formed on certain predetermined webs 124. Each guide 150 includes a foot portion 154 extending from base portion 148, a lower leg portion 156 and an upper leg portion 158. Lower leg portion 156 and upper leg portion 158 are substantially planar segments intersecting one another at an angle greater than 90° but less than 180°. A trough 160 is formed at the intersection of lower leg portion 156 and upper leg portion 158.

Guides 150 are spaced apart from one another such that pairs of upper edges 162 of upper leg portions 158 are spaced apart a distance less than a diameter of roller 50. Pairs of troughs 160 are spaced apart from one another a distance greater than the diameter of rollers 50. Accordingly, each roller 50 is captured within a pocket 164 between guides 150, first rim 140 and second rim 142 and free to rotate therein. Each guide 150 is a resilient member movable from its nominal position shown in the Figures. Because each guide 150 is individually movable, each roller 50 may be simultaneously engaged with contact surface 104 and one of cam surfaces 86 to transfer a maximum quantity of torque through clutch 10. The resiliently movable guides 150 allow a somewhat relaxed tolerancing of the components of clutch 10 while assuring that the full complement of rollers 50 transfer torque when required.

Regardless of which roller spring or multi-spring arrangement is implemented, it may be desirable to frequently start and stop internal combustion engine 14 during vehicle operation. When internal combustion engine 14 is stopped, neither outer race 46 nor inner race 48 are rotating. Accordion springs 59 biasedly engage arms 128 to urge rollers 50 toward deep ends 94 of cam surfaces 86, as shown in FIG. 6. Clutch 10 is in the open or free-wheeling mode.

Figure 10:
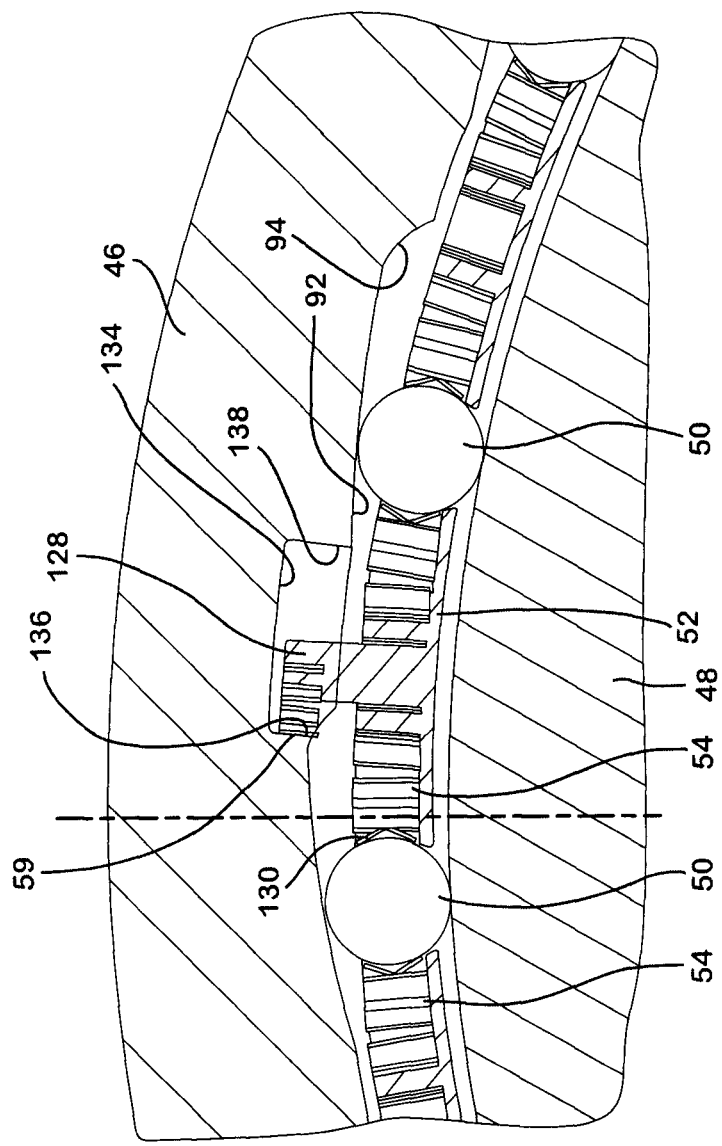
FIG. 10 is a fragmentary sectional view of the roller clutch assembly of FIG. 6 in a torque transferring mode of operation.

During a starting sequence, clutch 10 operates in the locked or torque transferring mode as shown in FIG. 10. Starter motor 30 is energized to rotate pinion gear 34. Through the meshed interconnection of pinion gear 34 and ring gear 36, drive plate 38 and outer race 46 are also rotated. At this time, crankshaft 32 and inner race 48 are not rotating. As such, relative rotation between outer race 46 and inner race 48 occurs urging rollers 50 toward shallow ends 92 of cam surfaces 86. Rollers 50 are wedged between cam surfaces 86 and roller contact surface 104 to transfer torque between outer race 46 and inner race 48. Accordion springs 59 are compressed.

Once internal combustion engine 14 has started, starter motor 30 is no longer energized. As internal combustion engine 14 runs, crankshaft 32 and inner race 48 rotate faster than outer race 46 and drive plate 38. Cam surfaces 86 no longer urge rollers 50 toward shallow ends 92. Force is provided from accordion springs 59 to rotate cage 52 and move rollers 50 into the position clear of inner race 48. Relative rotation between rollers 50 and outer race 46 does not occur and energy losses due to friction are avoided.

Lubricated for life overrunning clutch 10 provides a low cost, energy efficient solution for providing high torque capacity within a small packaging envelope. As previously mentioned, inner race 48 is fixed to crankshaft 32 thereby defining an inner diameter of clutch 10. An outer diameter of clutch 10 is minimized by closely packing as many rollers 50 as possible within the circumferential envelope defined by outer race 46 and inner race 48. In the example depicted in the figures, forty rollers are utilized. Each roller is substantially cylindrically shaped having a diameter of approximately 4 to 5 mm. The center-to-center distance between adjacent rollers is approximately 7.5 mm. As such, the gap between each adjacent roller is approximately 2.5 to 3.5 mm or 33 to 50% of the roller diameter. This roller sizing and packing configuration provides a theoretical high torque output. To assure that the actual torque capacity of clutch 10 substantially meets the theoretical torque capacity, roller springs 54 assure that each and every roller 50 transfers torque between outer race 46 and inner race 48 when clutch 10 operates in the locked mode.

Figure 11:
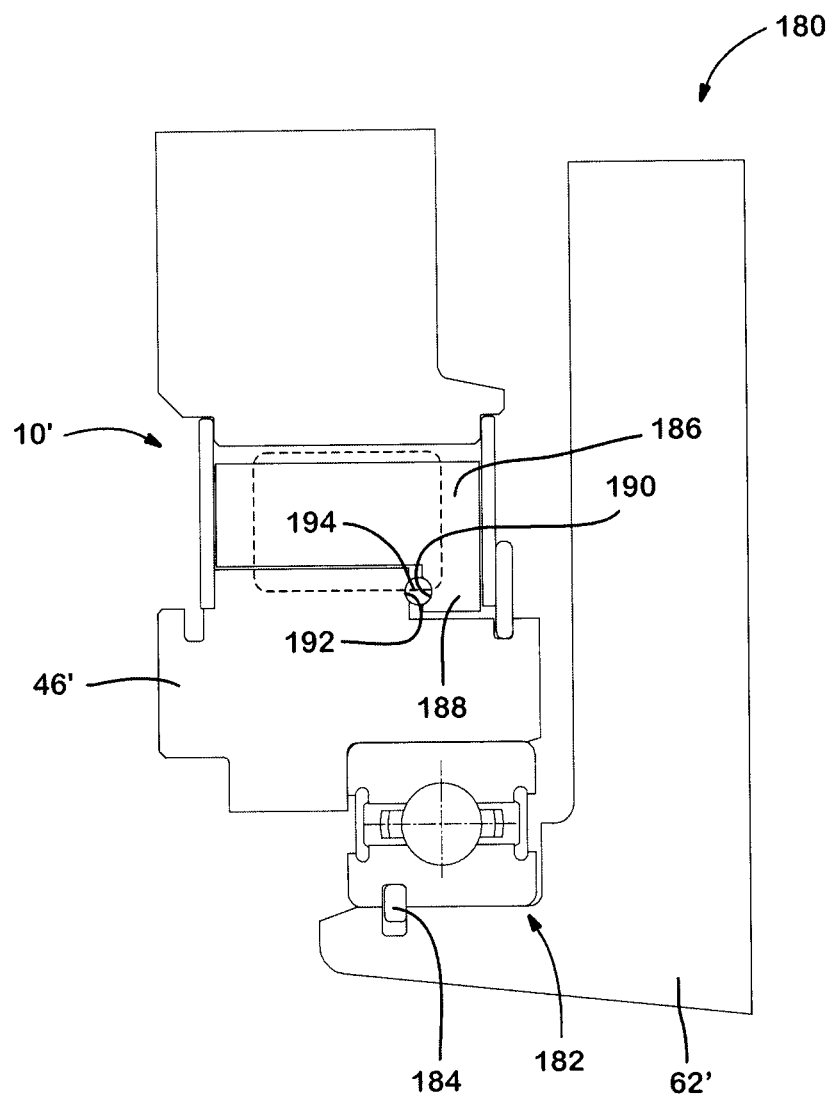
FIG. 11 is a fragmentary cross-sectional view depicting a portion of an alternate internal combustion engine starting system.

FIG. 11 depicts another torque transfer mechanism 180. Torque transfer mechanism 180 is substantially similar to torque transfer mechanism 8 previously described. Accordingly, like elements will retain their previously introduced reference numerals including a prime suffix. To further increase the operational efficiency of torque transfer mechanism 180, bushing 74' has been replaced with a bearing assembly 182. Bearing assembly 182 accurately locates and supports outer race 46' for rotation relative to engine block 62'. A snap ring 184 axially locates bearing assembly 182 on engine block 62'. Clutch 10' includes a cage 186 having a radially inwardly extending flange 188. Cage 186 includes a circumferential groove 190. A similar opposing circumferential groove 192 is formed on outer race 46'. One or more ball bearings 194 are positioned within grooves 190, 192 to guide cage 186 relative to outer race 46' and reduce the friction therebetween during relative rotation. It should be appreciated that during the open or free-wheeling mode of operation, no frictional losses occur between rollers 50', inner race 48', outer race 46' and cage 186.

Figure 12:
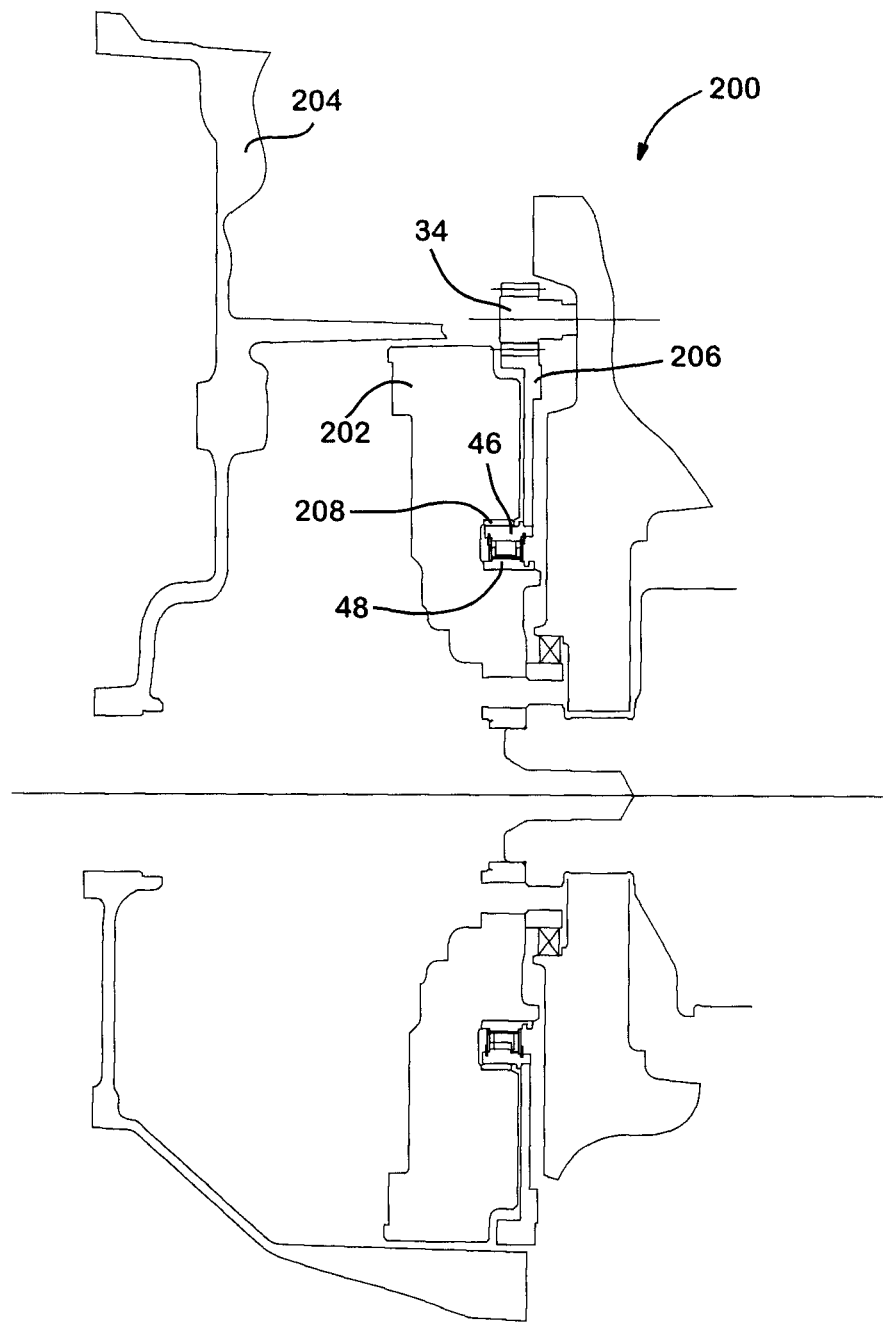
FIG. 12 is a fragmentary cross-sectional view depicting a portion of an alternate internal combustion engine starting system.

FIG. 12 depicts another alternate torque transfer mechanism at reference numeral 200. Torque transfer mechanism 200 illustrates that sealed for life clutch 10 may be positioned at any number of locations throughout the power transfer path because an oil feed from internal combustion engine 14 is not required. In particular, torque transfer mechanism 200 depicts clutch 10 connected to a dual mass flywheel or a torque converter 202. The dual mass flywheel or torque converter 202 is supported for rotation within a transmission housing 204. Engine crankshaft 32 is fixed for rotation with dual mass flywheel or torque converter 202. Accordingly, starter motor 30 may output a torque to a drive plate 206 that is fixed for rotation with outer race 46. Inner race 48 is press-fit to and fixed for rotation with dual mass flywheel or torque converter 202. A bushing 208 may be used to locate outer race 46 in the radial direction. Therefore, starter motor 30 may drive a transmission component instead of an internal combustion engine component.

Figure 13:
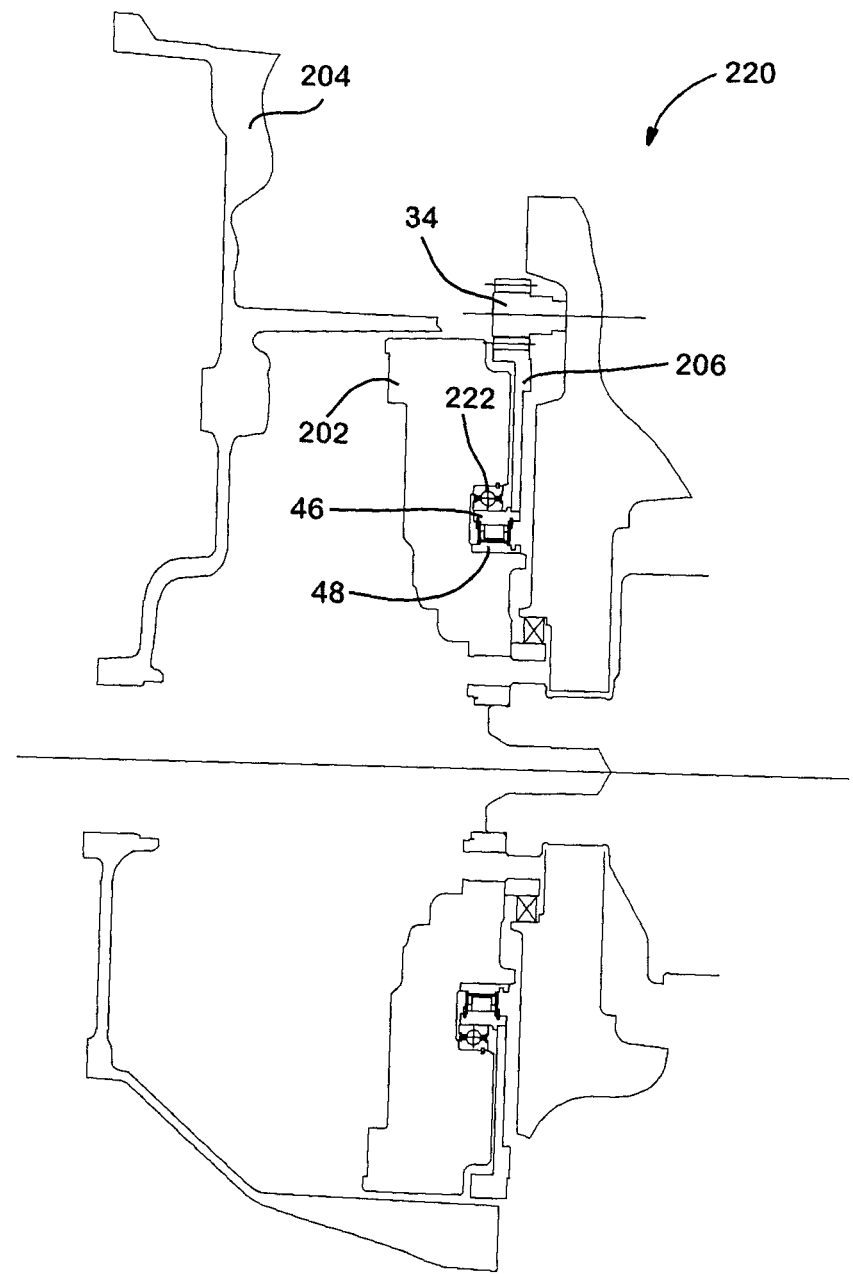
FIG. 13 is a fragmentary cross-sectional view depicting a portion of an alternate internal combustion engine starting system.

FIG. 13 depicts another variation of torque transfer mechanism 200 as identified as torque transfer mechanism 220. Torque transfer mechanism 220 differs from torque transfer mechanism 200 in that bushing 208 has been replaced with a bearing 222.

Figure 14:
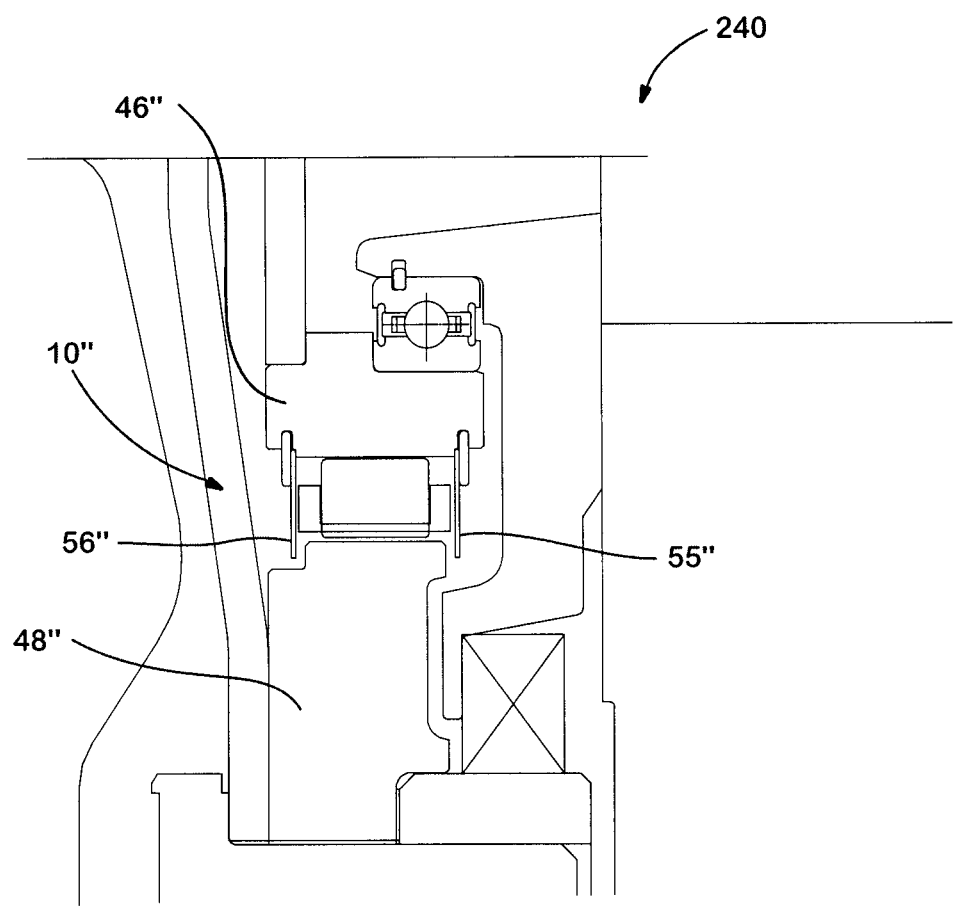
FIG. 14 is a fragmentary cross-sectional view depicting a portion of an alternate internal combustion engine starting system.

FIG. 14 depicts another alternate torque transfer mechanism 240. Torque transfer mechanism 240 is substantially similar to torque transfer mechanism 180 except that clutch 10 has been replaced with a dry one-way clutch 10". Clutch 10" is substantially similar to clutch 10 except that a lubricant is not trapped between inner race 48" and outer race 46" through the use of seal plates similar to those previously described. On the contrary, relatively large air gaps exist between seal plates 55", 56" and inner race 48". This arrangement assures a very low resistance to relative rotation between inner race 48" and outer race 46" is present during the free-wheeling mode of operation.

Figure 15:
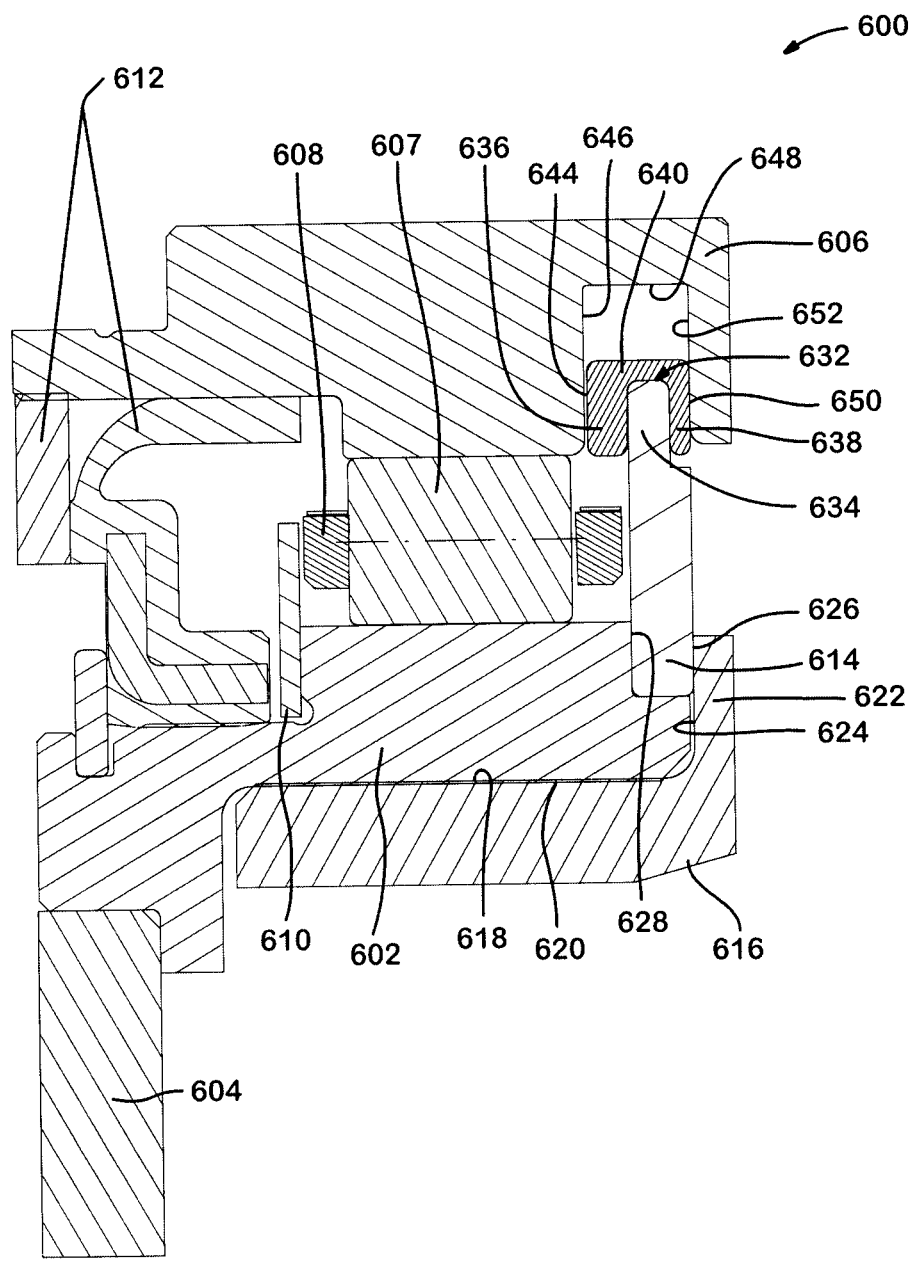
FIG. 15 is a fragmentary cross-sectional view of an alternate clutch equipped with a cap and a shoe.

FIG. 15 depicts another clutch identified at reference numeral 600. Clutch 600 includes an outer race 602 fixed for rotation with a drive plate 604, an inner race 606, rollers 607, a cage 608, a cage retainer plate 610, a seal 612 and an ID-OD clip or seal plate 614. Clutch 600 also includes a cap 616 that is coupled to outer race 602 via a shrink fit process. Accordingly, an inner cylindrical surface 618 of cap 616 applies a compressive force to an outer cylindrical surface 620 of outer race 602. The compressive force offsets a hoop stress occurring in outer race 602 when clutch 600 is locked.

Furthermore, cap 616 includes a radially inwardly extending flange 622 having a substantially planar inner face 624. Planar face 624 engages a face 626 of ID-OD clip 614. ID-OD clip 614 is trapped between flange 622 and a land 628 formed on outer race 602. Cap 616 functions to lock ID-OD clip 614 to outer race 602. ID-OD clip 614 is restricted from rotation relative to outer race 602 during clutch operation.

Clutch 600 also includes a shoe 632 fixed to an inner diameter portion 634 of ID-OD clip 614. Shoe 632 includes a "C"-shaped cross section having a first leg 636 and a second leg 638 interconnected by an end wall 640. Shoe 632 may be formed from bronze, a polymer or some other friction reducing guide material. Shoe 632 may be fixed to ID-OD clip 614 by a number of methods including mechanical fasteners such as rivets or via an adhesive. Alternatively, shoe 632 may be overmolded to ID-OD clip 614. In yet another version, shoe 632 may be formed from two pieces where the shoe is fixed with a mechanical lock that may separate under load conditions. First leg 636 includes a guide surface 644 spaced apart from a side wall 646 of a groove 648 formed in inner race 606. Similarly, second leg 638 includes a guide face 650 spaced apart from an opposite side wall 652 of groove 648.

Figure 16:
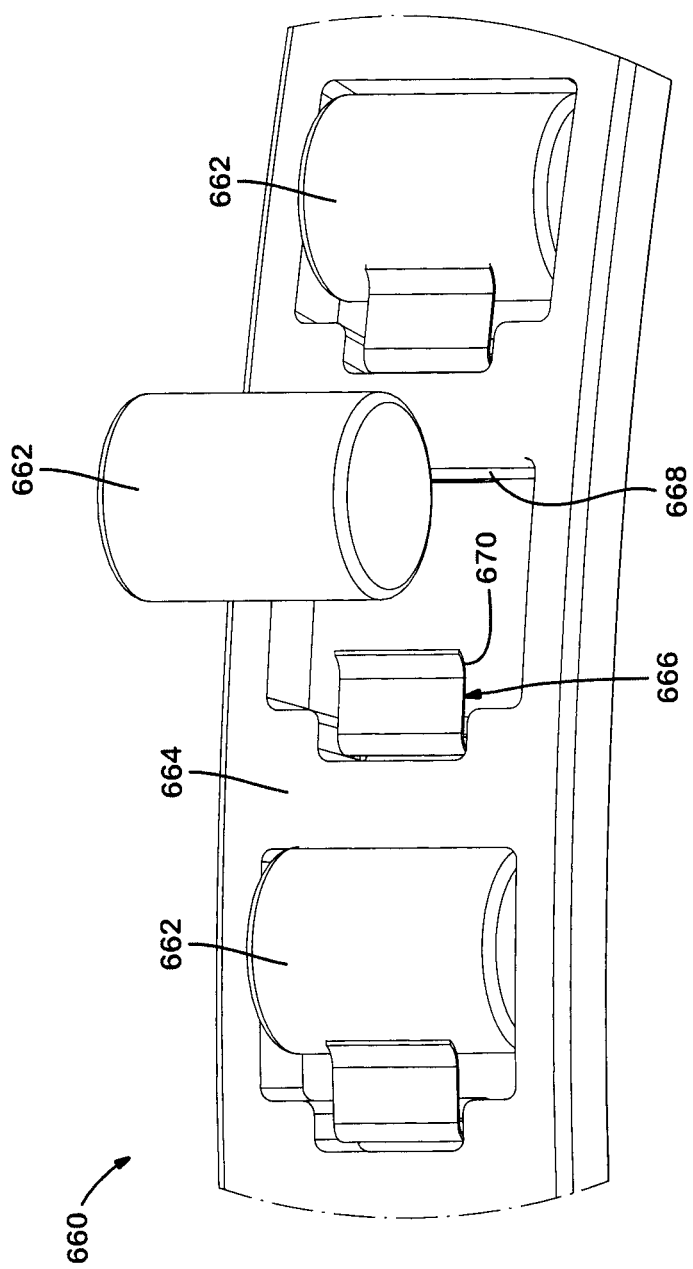
FIG. 16 is a fragmentary perspective view of an alternate cage and roller subassembly.
Figure 17:
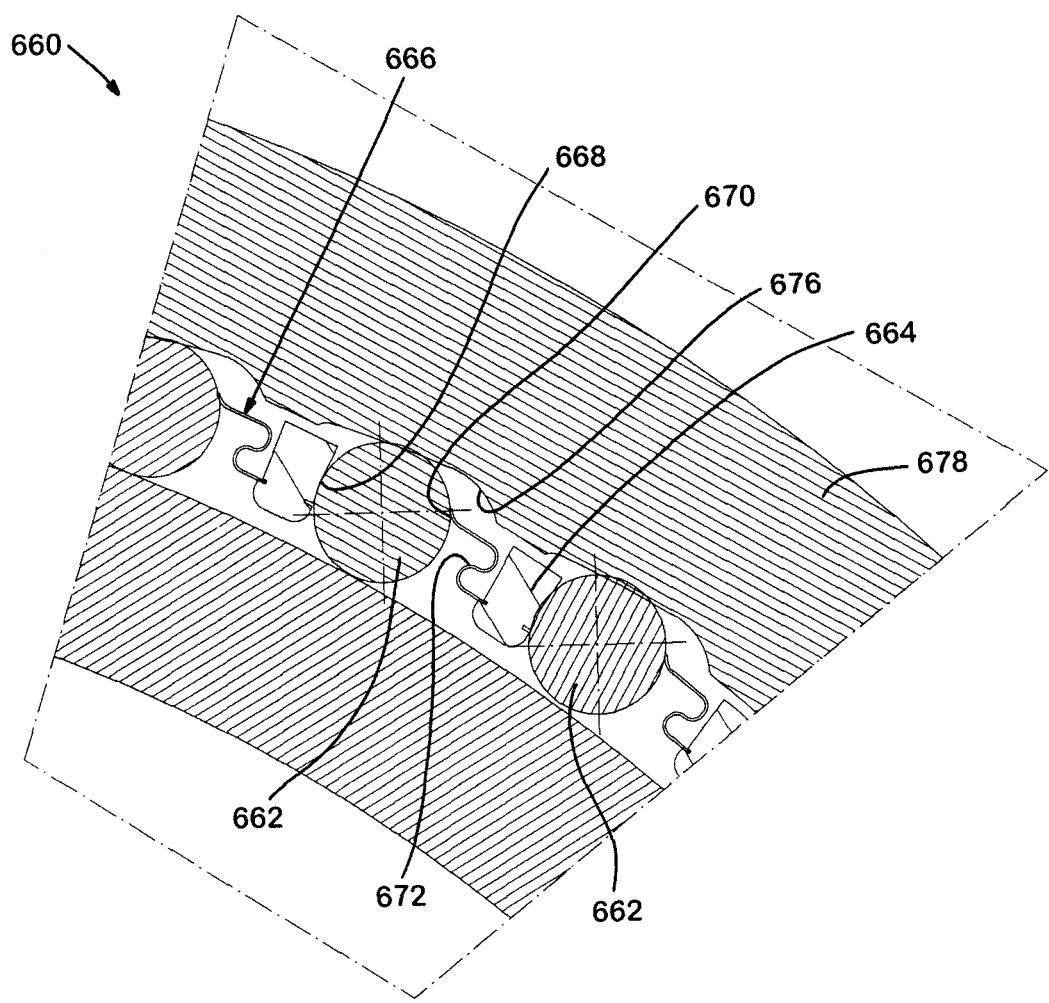
FIG. 17 is a fragmentary sectional view of the cage and roller assembly shown in FIG. 16.

FIGS. 16 and 17 depict an alternate roller and cage subassembly 660 including rollers 662, a cage 664 and a multi-spring 666. Each roller 662 is trapped between a concave surface 668 formed on cage 664 and a convexedly-shaped distal end 670 of multi-spring 666. A body portion 672 of multi-spring 666 includes a serpentine shape thereby allowing distal end 670 to deflect during clutch operation. Distal end 670 biases roller 662 toward concave surface 668. Roller 662 is positioned in a groove 676 formed in an outer race 678.

Figure 18:
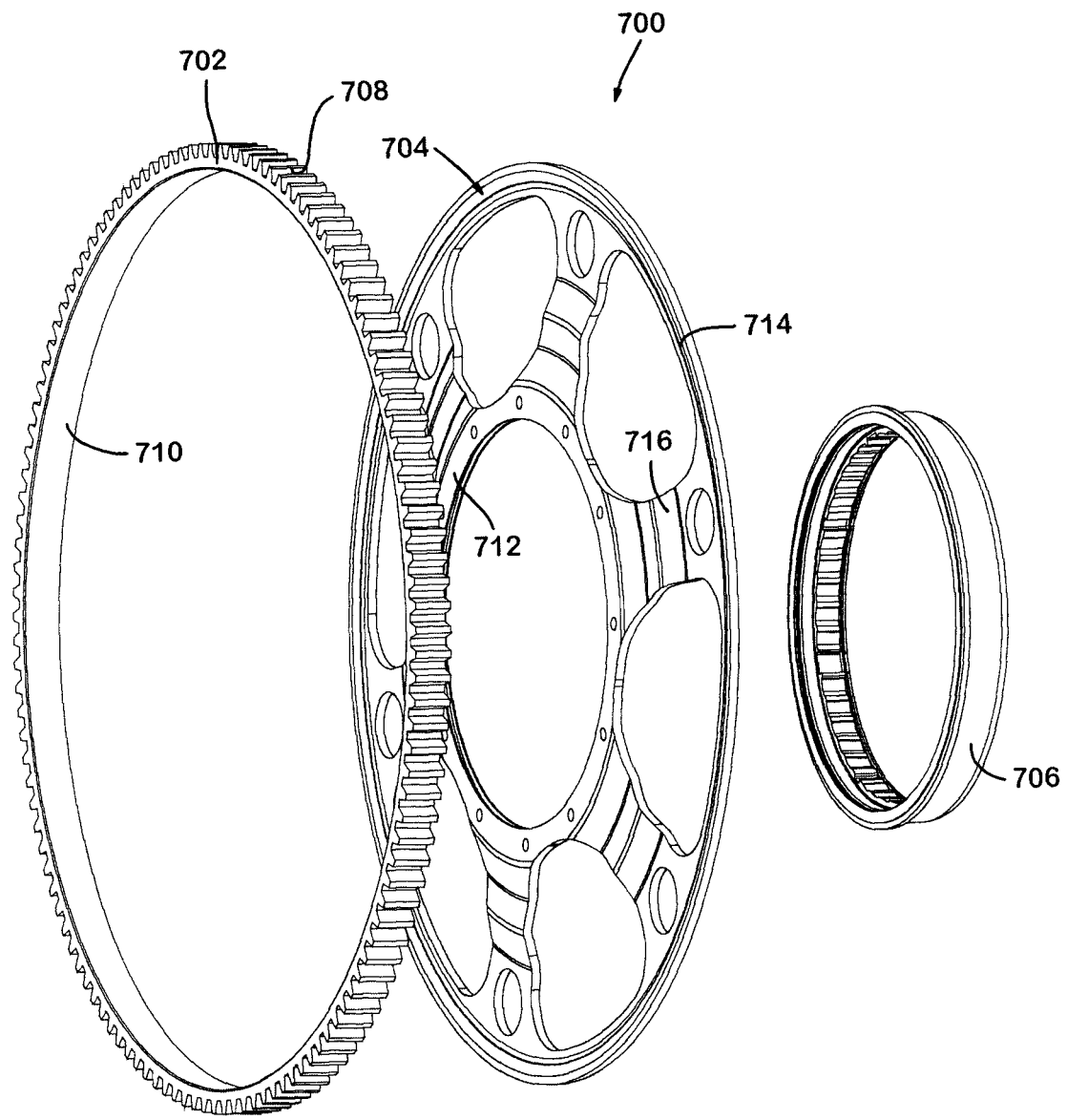
FIG. 18 is an exploded perspective view of an alternate drive plate assembly.

FIG. 18 depicts an alternate drive plate 700 including a gear 702, a hub 704 and an outer race 706. Gear 702 is preferably constructed from a metal such as hardenable steel and includes a plurality of external teeth 708, as well as a substantially inner cylindrical surface 710. Hub 704 includes an inner ring 712, an outer ring 714 and a plurality of radially extending spokes 716 interconnecting outer ring 714 and inner ring 712. Hub 704 is preferably constructed from a lightweight material such as a polymer. Outer race 706 is preferably constructed from a metal such as a hardenable steel and is substantially similar to the outer races previously described. Drive plate 700 may be constructed using a overmolding process where outer race 706 and gear 702 are placed within an injection mold cavity. Molten resin is injected into the mold cavity to define hub 704 while simultaneously fixing outer ring 714 to gear 702 as well as fixing inner ring 712 to outer race 706. The relatively low weight and low cost drive plate 700 may be used in conjunction with any of the clutches previously described.

Figure 19:
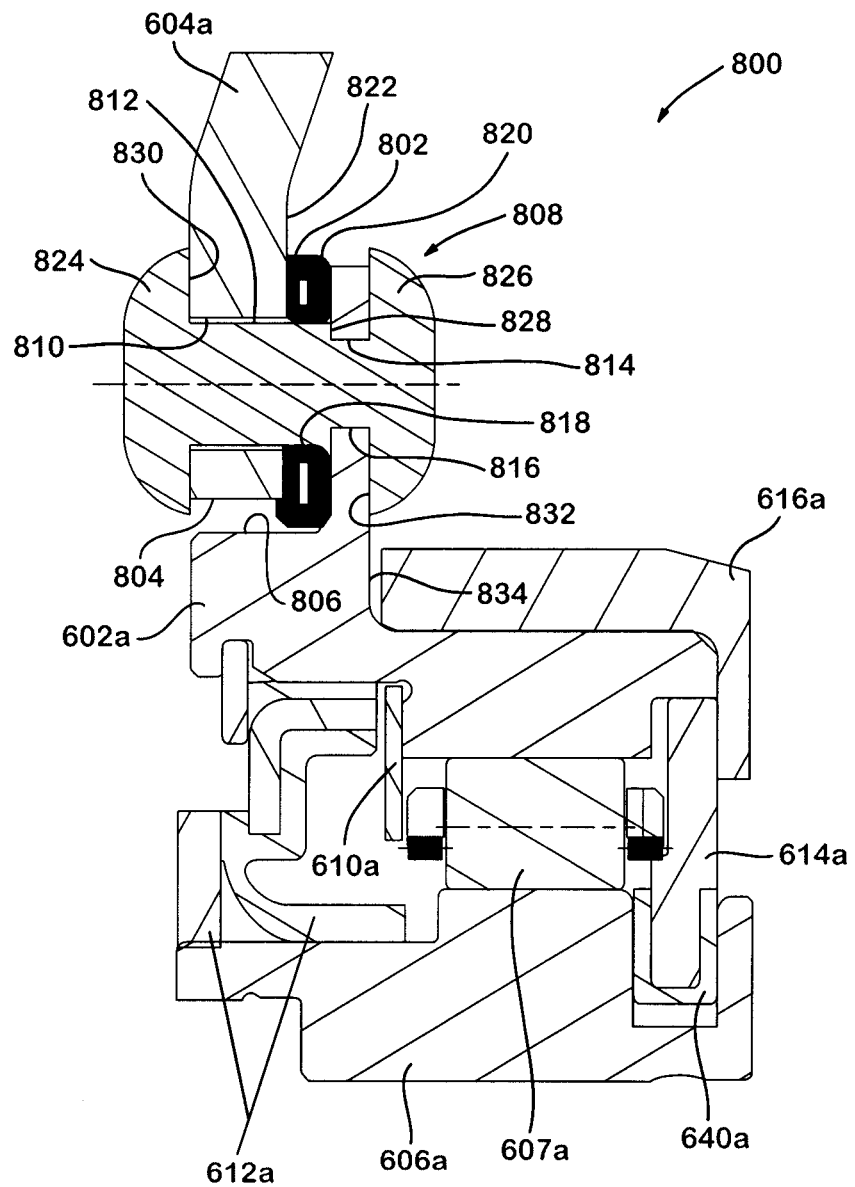
FIG. 19 is a fragmentary cross-sectional view depicting a portion of another alternate combustion engine starting system having a clutch with a vibration damper.
Figure 20:
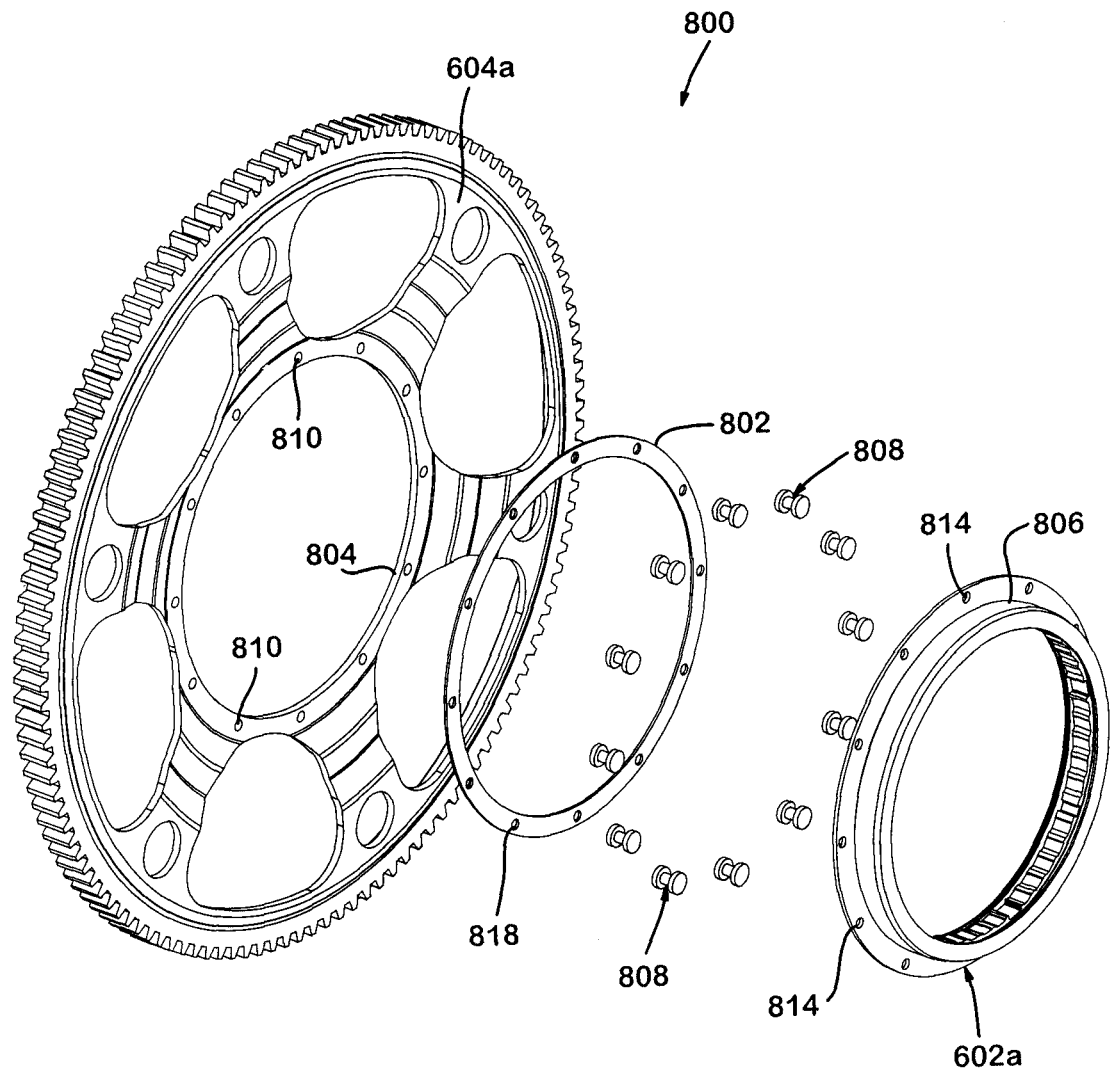
FIG. 20 is a partial exploded perspective view of the clutch depicted in FIG. 19.
Figure 21:
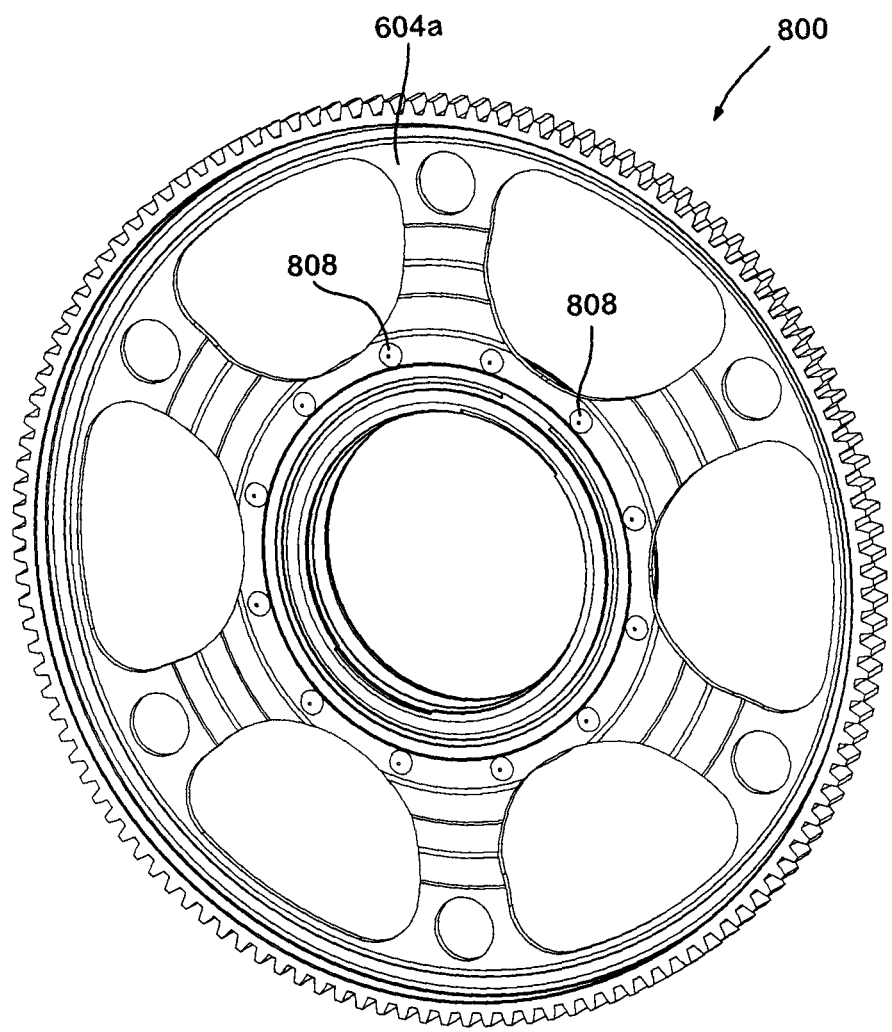
FIG. 21 is a plan view of an assembly including a drive plate and roller clutch depicted in FIGS. 19 and 20.

FIGS. 19-21 show another alternate torque transfer mechanism identified at reference numeral 800. Torque transfer mechanism 800 includes a clutch substantially similar to previously described clutch 600. Accordingly, like elements will be identified with similar reference numerals including a lower "a" suffix. Torque transfer mechanism 800 differs from the torque transfer mechanisms previously described in that drive plate 604a is not rigidly coupled to outer race 602a as the previous drive plate to outer race interconnections have been described.

Vibration and dynamic loading due to crankshaft movement during engine operation may result in high torque or torque spikes being transferred to various components of torque transfer mechanism 800. In particular, it is contemplated that ID-OD clip or seal plate 614a may bind in its associated groove or grooves due to a breakdown of a hydrodynamic oil film therebetween. An oscillatory force may be transferred to outer race 602a and drive plate 604a while these components are in a stationary position while the engine is running. Such dynamic load transfer may adversely affect the life of torque transfer mechanism 800.

To address these issues, torque transfer mechanism 800 includes a vibration damper 802 associated with drive plate 604a and outer race 602a to isolate and dampen crankshaft axial and tipping oscillation that may occur between drive plate 604a and outer race 602a. A compliance is introduced into the joint between drive plate 604a and outer race 602a, as will be described.

Drive plate 604a includes a central aperture 804 having an inner diameter sized greater than an outer diameter 806 of outer race 602a. During operation of torque transfer mechanism 800, drive plate 604a does not directly contact outer race 602a.

A plurality of fasteners 808 are circumferentially spaced apart from one another and function to drivingly connect outer race 602a to drive plate 604a. Drive plate 604a includes a plurality of circumferentially spaced apart apertures 810 in receipt of a substantially cylindrical body portion 812 of fastener 808. Outer race 602a also includes a similar set of circumferentially spaced apart apertures 814 in receipt of a reduced diameter portion 816 of fastener 808.

Damper 802 is a ring-shaped member including a plurality of circumferentially spaced apart apertures 818 extending therethrough. Damper 802 is constructed from an elastomeric material such as natural rubber, foam, a polymer or another elastomeric material. Damper 802 has a thickness in a free state that is greater than its as-assembled thickness. Therefore, damper 802 is biasedly engaged with a surface 820 of outer race 602a and a surface 822 of drive plate 604a.

Prior to fastening drive plate 604a to outer race 602a, fastener 808 is shaped to include a head portion 824, body portion 812, and reduced diameter portion 816. A deformed portion 826 does not yet exist. It should be appreciated that body portion 812 terminates at a shoulder 828 extending substantially parallel to a surface 830 of head portion 824. A predetermined distance is defined between shoulder 828 and surface 830 that is less than the sum of the thickness of drive plate 604a and the undeformed thickness of damper 802. In this manner, the length of body portion 812 defines the magnitude of compression imparted to damper 802 upon assembly.

To couple drive plate 604a to outer race 602a, fasteners 808 are positioned to extend through apertures 810, 818 and 814 as shown in FIG. 19. A load is applied to engage shoulder 828 with outer race 602a. At this time, reduced diameter portion 816 of fastener 808 is mechanically manipulated such that deformed portion 826 is defined. More particularly, a surface 832 is placed into engagement with a surface 834 of outer race 602a. Fasteners 808 maintain damper 802 in a compressed state. After the fastening operation has been completed and damper 802 has been compressed, a diametral clearance remains between apertures 810 and body 812. During the mechanical rivet clinching or deformation process, reduced diameter portion 816 is enlarged to fill aperture 814 and engage outer race 602a while deformed portion 826 is being formed.

In the Figures, fastener 808 is depicted as a mechanically deformable solid rivet. It should be appreciated that a number of other fasteners may also be used. For example, threaded shoulder bolts, hollow rivets, welded fasteners or the like may also perform the desired functions for fasteners 808 and are contemplated as being within the scope of the present disclosure.

Interconnection of drive plate 604a and outer race 602a via damper 802 has been described in conjunction with one particular clutch arrangement. It should be appreciated that the vibration damper coupling arrangement may also be used with any of the previously described torque transfer mechanisms and their permutations without departing from the scope of the present disclosure.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A starting system for a hybrid vehicle including an internal combustion engine having a crankshaft rotatably supported within an engine block, the starting system comprising:
    a starter motor;
    a pinion gear selectively driven by the starter motor;
    a drive plate having a set of teeth in constant meshed engagement with the pinion gear;
    a one-way clutch assembly for drivingly interconnecting the drive plate and the crankshaft, the clutch assembly including an inner race adapted to be fixed for rotation with the crankshaft, an outer race coupled for rotation with the drive plate and a plurality of roller elements positioned radially therebetween;
    an elastomeric damper; and
    a fastener coupling the drive plate to the outer race and compressing the damper between the drive plate and the outer race.

2. The starting system of claim 1 wherein the drive plate is spaced apart from the outer race by the damper.

3. The starting system of claim 2 wherein the damper is shaped as a ring surrounding the inner race.

4. The starting system of claim 1 wherein the fastener includes a substantially cylindrical body portion and a reduced diameter portion.

5. The starting system of claim 4 wherein the body portion terminates at a shoulder, wherein the fastener maintains the shoulder in engagement with the outer race.

6. The starting system of claim 4 wherein the body portion includes a length less than a sum of a thickness of the drive plate and a free-state thickness of the damper.

7. The starting system of claim 1 wherein the fastener includes one of a rivet and threaded fastener.

8. The starting system of claim 1 wherein a diametral clearance exists between the fastener and the drive plate after the fastener is secured to the outer race.

9. The starting system of claim 1 wherein the outer race is adapted to be supported for rotation by the engine block.

10. The starting system of claim 9 further including a retaining ring positioned within a ring groove formed on the outer race to restrict movement of the clutch relative to the engine block.

11. The starting system of claim 1 further including a cage for positioning the rollers in circumferentially spaced apart alignment with cam surfaces fixed to one of the inner and the outer race.

12. The starting system of claim 11 further including a spring acting on the cage to space apart the roller elements from the inner race and place the clutch in a free-wheeling mode.

13. The starting system of claim 1 further including a cap including an inner surface circumscribing and being biasedly engaged with an outer surface of the outer race.

14. The starting system of claim 13 wherein the cap is fixed to the outer race in a shrink fit.

15. The starting system of claim 14 wherein the cap includes a flange engaging one of the seal plates to restrict relative rotation between the outer race and one of the seal plates.

* * * * *